Sept. 20, 1966 M. G. TOWNSLEY 3,273,565

FILE CARD RETRIEVAL APPARATUS

Filed Oct. 17, 1962 6 Sheets-Sheet 1

Inventor:
Malcolm G. Townsley
By Hill, Sherman, Meroni, Gross & Simpson
Attys.

Sept. 20, 1966 M. G. TOWNSLEY 3,273,565

FILE CARD RETRIEVAL APPARATUS

Filed Oct. 17, 1962

6 Sheets-Sheet 2

Inventor:
Malcolm G. Townsley
By
Hill, Sherman, Meroni, Gross & Simpson
Attys.

Sept. 20, 1966 M. G. TOWNSLEY 3,273,565

FILE CARD RETRIEVAL APPARATUS

Filed Oct. 17, 1962 6 Sheets-Sheet 3

Inventor:
Malcolm G. Townsley
By Hill, Sherman, Meroni, Gross & Simpson Attys.

Sept. 20, 1966 M. G. TOWNSLEY 3,273,565

FILE CARD RETRIEVAL APPARATUS

Filed Oct. 17, 1962 6 Sheets-Sheet 4

Inventor.
Malcolm G. Townsley
By
Hill, Sherman, Meroni, Gross & Simpson Attys.

Inventor
Malcolm G. Townsley
By Hill, Sherman, Meroni, Gross & Simpson
Attys.

Sept. 20, 1966 M. G. TOWNSLEY 3,273,565

FILE CARD RETRIEVAL APPARATUS

Filed Oct. 17, 1962 6 Sheets-Sheet 6

Inventor:
Malcolm G. Townsley
By Hill, Sherman, Meroni, Gross & Simpson Attys.

3,273,565
FILE CARD RETRIEVAL APPARATUS
Malcolm G. Townsley, Park Ridge, Ill., assignor to Bell & Howell Company, Chicago, Ill., a corporation of Illinois
Filed Oct. 17, 1962, Ser. No. 231,080
10 Claims. (Cl. 129—16.1)

The present invention relates to improvements in filing systems utilizing coded cards and more particularly concerns apparatus for retrieving any selected card from a haphazardly filed but individually coded file or collection of file cards.

Many types of information are desirably recorded on cards of any preferred size which are then filed away in a drawer or other receptacle. Such cards may have the material entered thereon in some form of writing or by a reproduction method suitable to record the desired information. Cards are also now utilized for filing microfilmed records of various kinds, one card often containing a series of microfilm frames of related subject matter. All such cards whether for record or reference purposes must be readily selectable and retrievable from the general file, and the filing system should be as foolproof as possible to avoid misfiling and thus, in effect, loss of the card through inability to locate it when desired.

Various mechanical card finding arrangements have heretofore been proposed including pins, bars, levers, and even some that employ bar magnets or electro-magnets for locating and retrieving desired cards according to some predetermined identifying system.

Undue complexity, cumbersomeness, delicate apparatus components, limited range of usefulness, and other deficiencies in prior systems and apparatus have limited or discouraged their adoption, at least to any significant extent.

An important object of the present invention is to overcome the enumerated and other shortcomings of the prior art and to provide a simple, rugged, efficient coded card retrieval apparatus.

Another object of the invention is to provide a new and improved card retrieval apparatus wherein a relatively small, compact retrieval assembly is operable to retrieve selected cards form a large number of cards in a filing receptacle by movement of the retrieval unit and the receptacle relatively.

A further object of the invention is to provide a novel card retrieval apparatus employing a rotary magnet for effectiving withdrawal of selected cards from a file.

A still further object of the invention is to provide a new and improved magnetic card retrieval device including a novel arrangement of rotary retrieval magnet and selector bars.

Yet another object of the invention is to provide a new and improved manually operable card retrieval apparatus.

It is still another object of the invention to afford a new and improved method of searching for and retrieving selected cards from a pack of filed cards.

Other objects, features and advantages of the present invention will be readily apparent from the following detailed description of a preferred embodiment thereof taken in conjunction with the accompanying drawings, in which.

Figure 1:
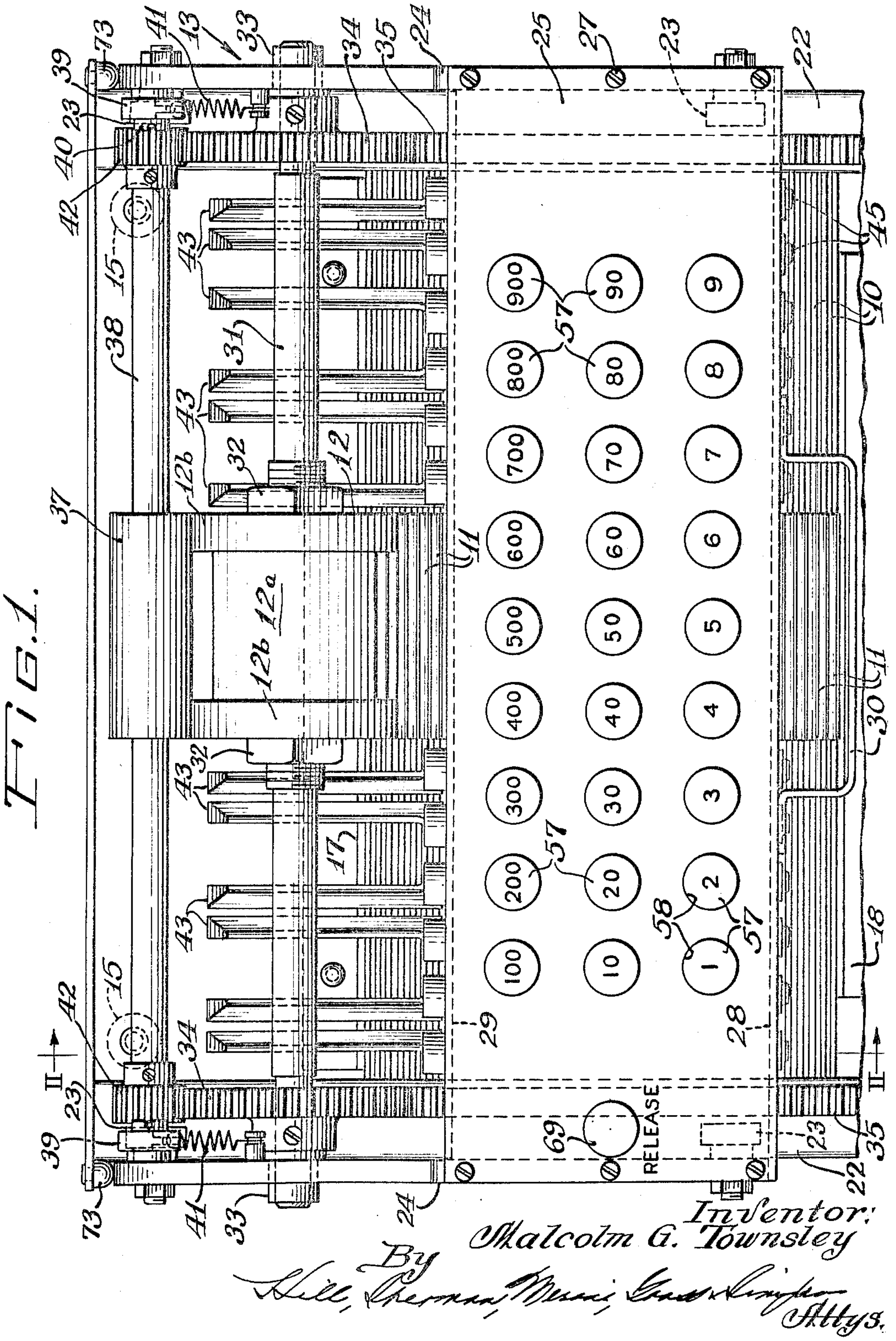
FIGURE 1 is a top plan view of apparatus embodying features of the invention.
Figure 6:
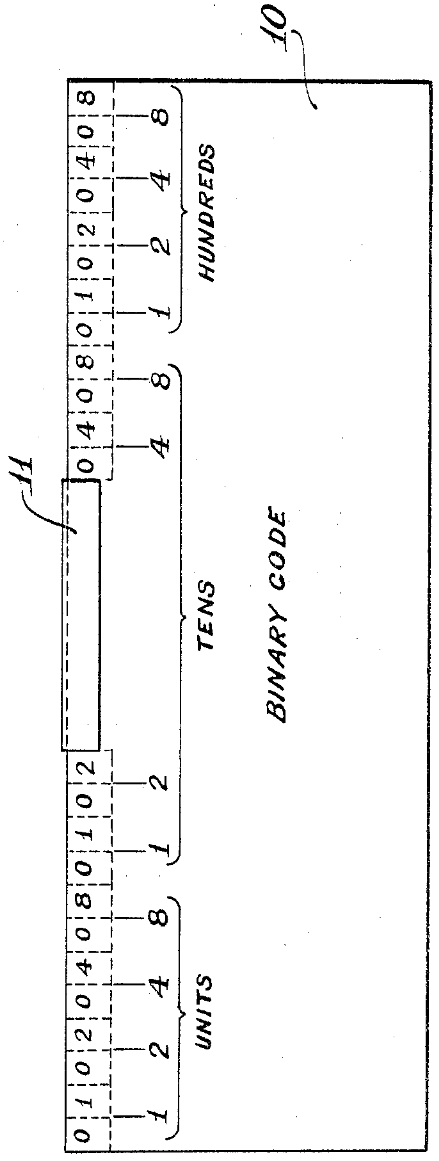
FIGURE 6 shows one of the file cards adapted for use with the present apparatus.

Referring to FIGURES 1 and 6, file cards 10 which may be of any preferred dimensions and material are equipped along one edge, preferably the upper edge, with magnetically attractable, and preferably ferromagnetic means 11, comprising in a practical form a thin ferromagnetic strip doubled upon itself and clamped onto the upper margin of the card so that the connecting web between the two legs of the magnetic strip overlies the edge of the card. If preferred, the strip 11 may be magnetized.

In an economical arrangement, the magnetic strip 11 is short relative to the attached edge of the card and desirably located centrally on the card so as to be magnetically attracted to a magnetic member 12 of a card retrieval device including a carriage 13 constructed and arranged to be operatively associated with a receptacle member 14 desirably in the form of a filing tray 14 constructed and arranged to support a substantial set of the cards 10.

Although the tray 14 is disclosed as a portable structure having suitable means such as rubber casters 15 for supporting it on a table top or other surface, it may, obviously, be readily adapted as a file drawer to be housed in a suitable cabinet in which it may be readily accessible by drawing it from the cabinet or otherwise. Within the tray the cards are supported in vertical position between the longitudinal side walls of the tray between a vertical back-up plate 17 adjacent to the rear of the tray and an adjustable generally L-shaped retaining bracket plate 18 having a base flange 19 secured as by means of a thumb screw 20 in proper position to maintain the pack of the cards 10 in vertical position standing on edge on the bottom wall of the tray and with their side edges confined in as close as practicable alignment by the side walls of the tray. Adjustment of the confining or pressure plate 18 longitudinally within the tray is enabled by provision of a longitudinal slot 21 (FIGS. 2 and 5) accommodating the shank of the thumb screw 20.

Retrieval of the cards 10 from the pack in the tray is effected by relatively moving the magnetic retriever 12 over the central tab portions 11 of the cards by relatively longitudinally moving the carriage 13 and the tray 14. In the portable tray arrangement chosen for illustrative purposes, this relative movement is enabled by having the carriage mounted for travel upon the tray 14 which for this purpose is provided with outwardly projecting coplanar horizontal reinforced longitudinal flanges 22 on the upper ends of the side walls of the tray serving as rails for carriage wheels 23 in the form of rollers attached to the lower marginal portions of respective left and right side identical vertical parallel respective side frame plates 24 of the carriage. Longitudinal guides for the carriage are provided by lower marginal portions of the side frame plates 24 which project sufficiently below the lower nips of the carriage wheel rollers 23 to oppose the respective edges of the rail flanges 22 slidably.

Figure 2:
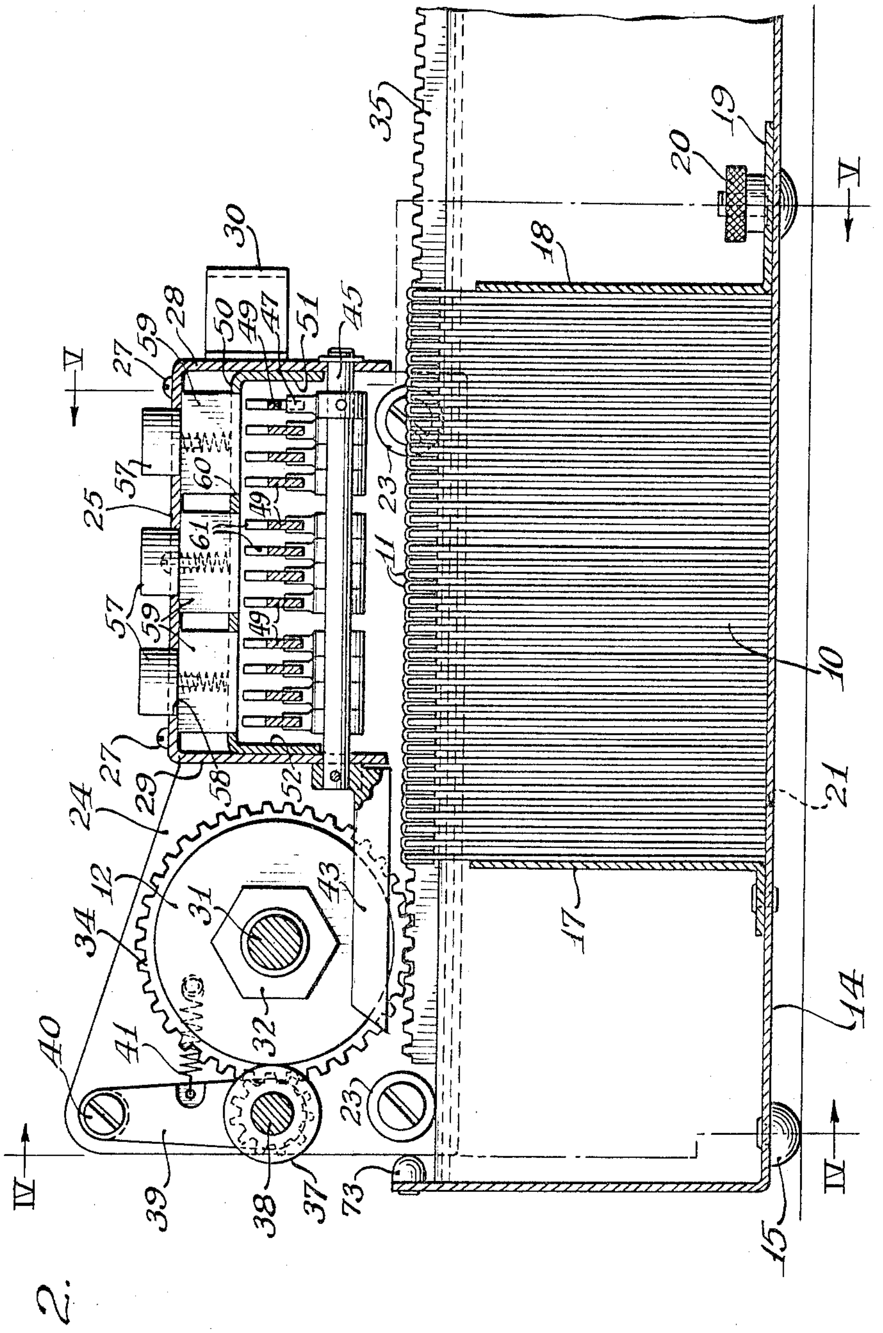
FIGURE 2 is a vertical sectional detail view taken substantially on the line II—II of FIGURE 1.

Attachment of the side frame plates 24 of the carriage 13 into a substantially rigid frame structure is accomplished in part by a horizontal plate member 25 secured in any suitable manner as for example by means of screws 27 to coextensive forward portions of the upper edges of the side frame plate members. This frame plate 25 is preferably of inverted U-shape as best seen in FIGURE 2 provided with a front depending flange portion 28 and a rear depending flange portion 29 extending entirely between the side plates 24 and with the front flange 28 preferably overlapping the front edges of the side plates. For convenience in manually actuating the carriage 13 longitudinally along the tray 14, a handle 30 is provided attached to the front face of the frame flange 28. Rearwardly from the frame plate member 25, rearwardly extending portions of the side frame plates 24 carry means not only affording additional frame structure connecting the side plates but also supporting the magnetic retriever 12, in this instance comprising a transverse member 31 in the form of a shaft to which the magnetic retriever 12 is centrally attached as by means of retaining nuts 32.

Figure 4:
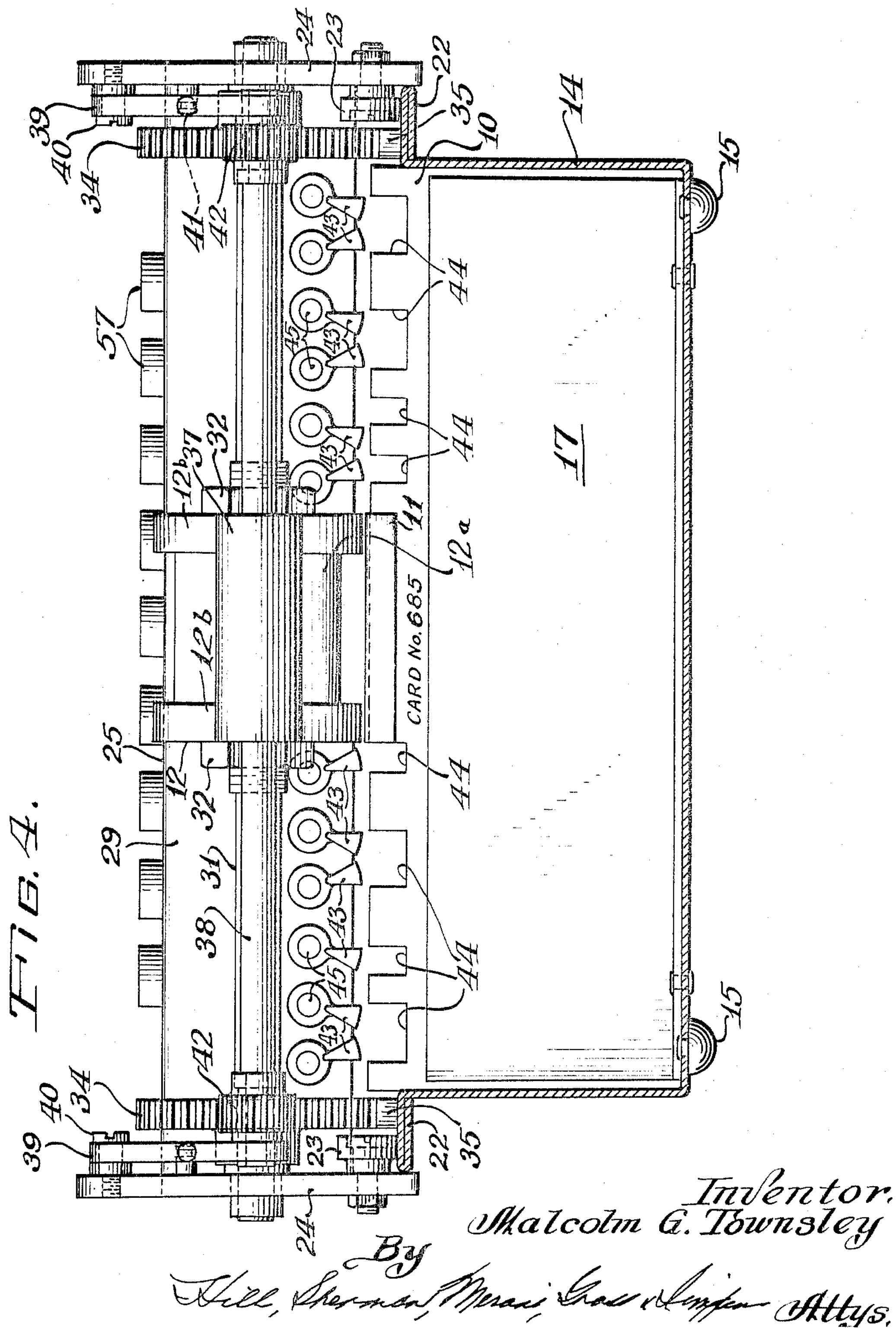
FIGURE 4 is a vertical sectional elevational detail view taken substantially on the line IV—IV of FIGURE 2.
Figure 5:
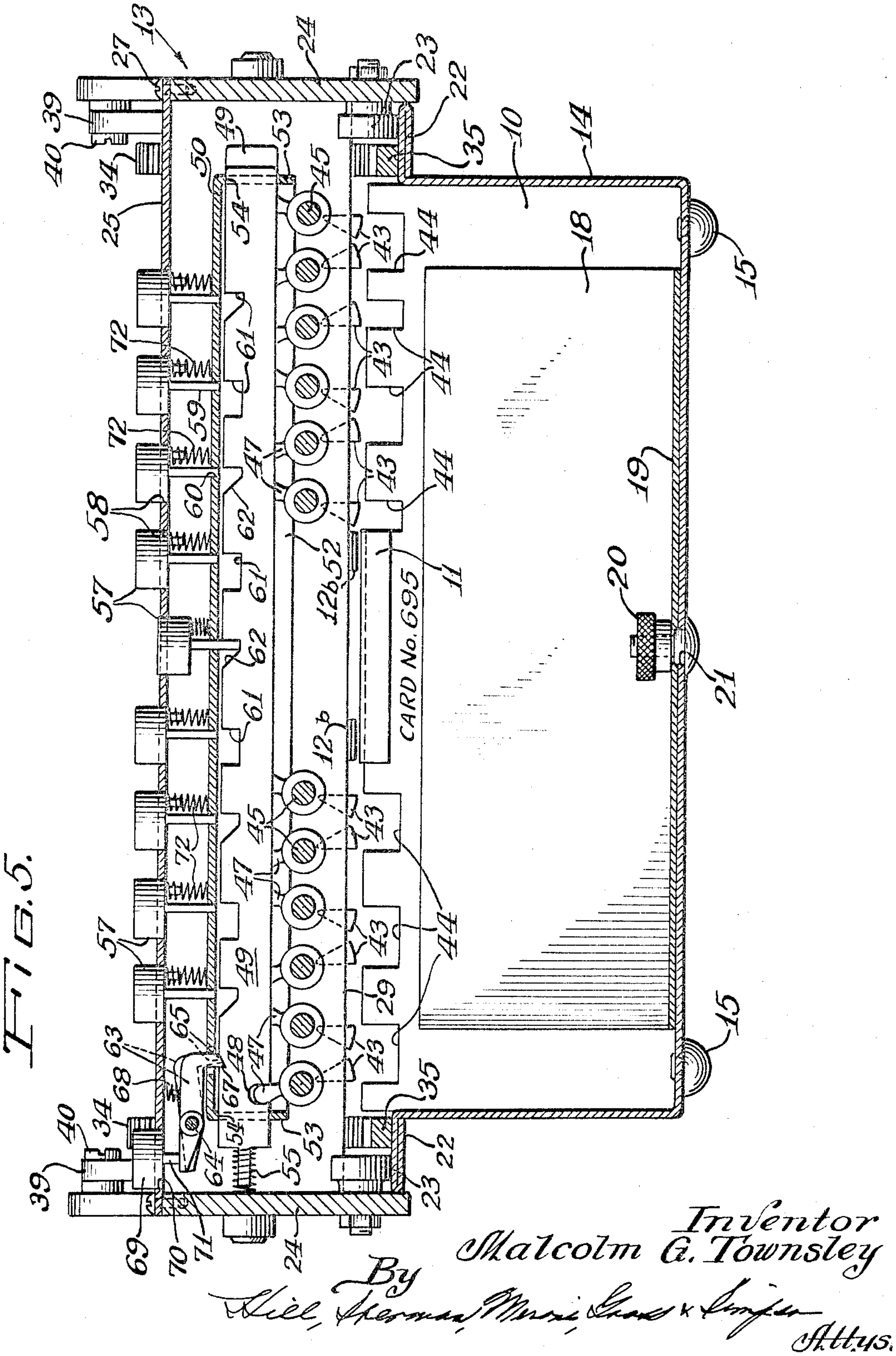
FIGURE 5 is a vertical sectional detail view taken substantially on the irregular section line V—V of FIGURE 2.

Desirably, the magnetic retriever 12 is in the form of a rotatable cylinder or roll and the supporting shaft 31 to which it is affixed is rotatably mounted on the side frame plates 24 by having its end portions journalled in bearings 33 (FIGS. 1, 4 and 5). This mounting of the magnetic retriever roll 12 is such that its periphery is located close to and in only barely clearance relation to a horiztonal plane across the tops of the magnetic card tabs 11. Thereby when the carriage 13 is motivated to move the magnetic retriever 12 over the card tabs 11, magnetic attraction tends to cause the magnetic tabs to attach themselves to the magnetic retriever for withdrawal of the cards from the pack of cards 10. This magnetic attraction may be either by having the card tabs 11 permanently magnetized or of magnetic material such as soft iron, or by having the magnetic retriever 12 provided with at least its perimeter permanently magnetic or of magnetic material. Although the retriever 12 may be an electromagnet, for economy it is preferably permanently magnetic, comprising a permanent magnet wheel body **12*a* and soft iron pole disk pieces 12*b*. As the tabs 11 are magnetized by the magnetic flux of the retriever 12, their north and south poles are at the same ends, so that the tabs are mutually repulsive, thus avoiding any problems of magnetic sticking of the tabs 11** and interference with withdrawal of the cards.

Figure 3:
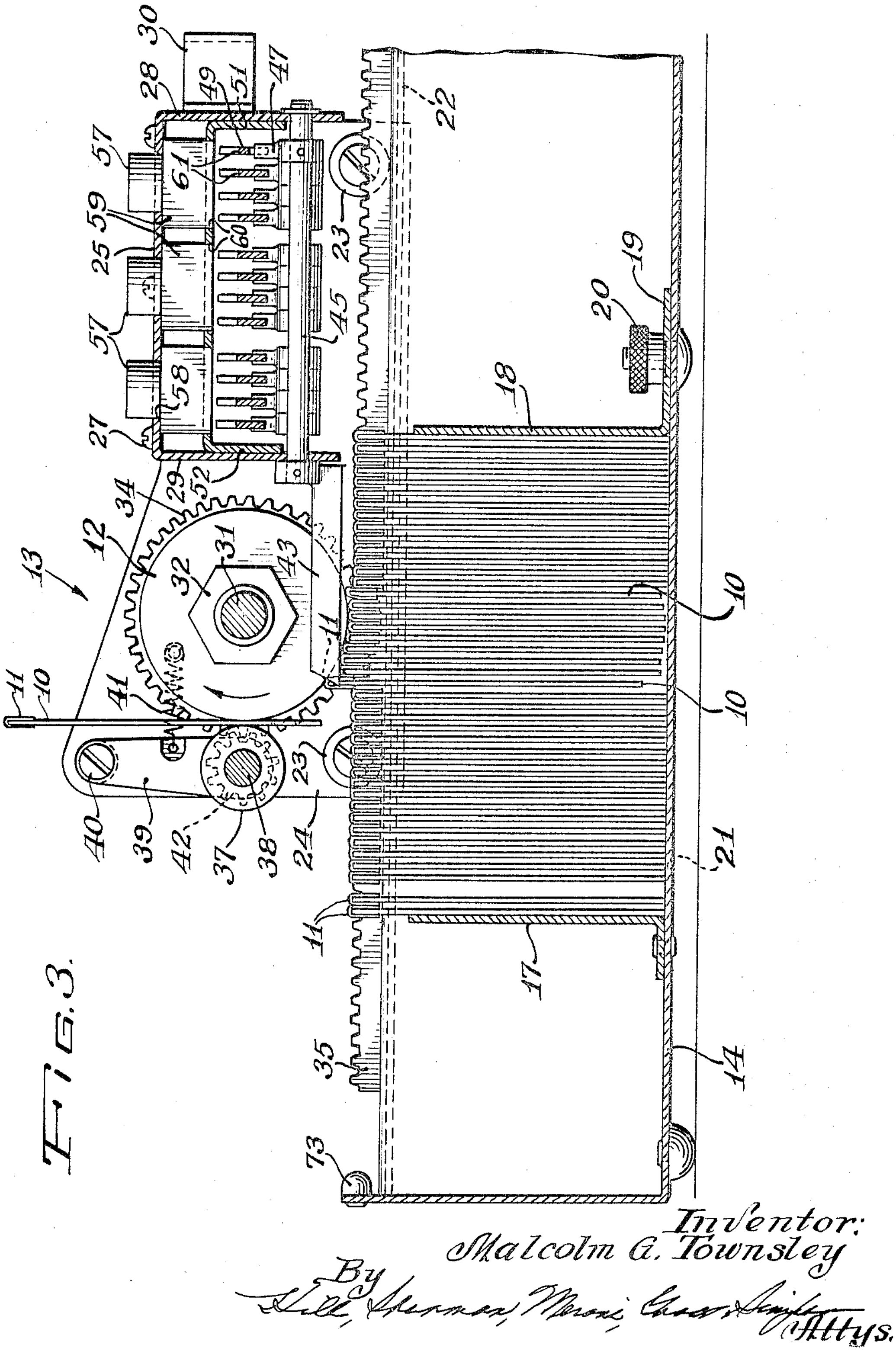
FIGURE 3 is a view similar to FIGURE 2 but showing the retrieval apparatus as it functions to retrieve coded cards from the file.

In addition to attracting the respective file cards 10, the magnetic retriever 12 serves to separate selected cards from the pack of cards by lifting the selected cards upwardly free from the pack in the receptacle 14. To this end, means are provided for rotating the retriever roll 12 as it is moved by the carriage 13 over the cards. In a desirable arrangement, respective gears 34 are mounted corotatively upon the journalled end portions of the shaft 31 adjacent to the bearings 33 and with the gear teeth of the gears meshing with respective longitudinal racks 35 mounted fixedly upon the inner marginal portions of the track flanges 22. As a result, as the carriage 13 is moved reciprocably over the upstanding cards, the gears 34 running in the racks 35 turn the shaft 31 and thereby the retriever roll 12, and as a card is selected from the pack of cards adherence of the associated magnetic tab 11 of the card to the perimeter of the retriever roll 12 causes this card, which has been searched out by the retriever, to be pulled from the pack substantially as shown in FIGURE 3 as the adhering magnetic tab 11 travels upwardly with the perimeter of the rotating roll.

After extraction of the selected card has been thus initiated it is desirable to break the magnetically attracted tab 11 of the selected card from the perimeter of the retriever roll 12 and present the retrieved card for removal or deliver it to a receiver, stacker, or the like (not shown). Therefore, a follower or pressure roller 37 is mounted to be urged toward the retriever roll 12 above the draw-out nip of the roll and adjacent to a horizontal plane through the axis of the roll. Thereby, the roller 37 engages and thrusts the body of the card between the nips of this roller and the roll 12, resisting bending of the upper portion of the card to travel overhand with the retrieval roll perimeter. The inherent stiffness of the card causes the magnetic tab 11 to pull away from the retrieval roll 12 as the card is carried upwardly between the roll and the roller in the continuing rotation of the retrieval roll. For efficient gripping, the pressure and breaker roller 37 comprises a material presenting a perimeter of high coefficient of friction such as natural rubber or one of the synthetic plastic rubber materials or compounds, i.e. GR–S, polyurethane, and the like, suitable for this purpose.

In addition, the roller 37 is preferably mounted to be positively rotated in the direction of retrieval, pull-out withdrawal movement of the selected card but at a slightly greater peripheral speed than the peripheral speed of the retrieval roll 12. To this end, the roller 37 is mounted corotatively on a shaft 38 journalled at its respective opposite ends of the lower end portions of respective hanger links 39 having upper end portions pivotally attached as by means of journal bolts 40 to upper rear end portions of the respective associated side frame plates 24. Biasing means such as respective tentio between the pinions 42 and the gear 34 relative to their pivots to bias the shaft 38 and thereby the roller 37 yieldably toward the off-running side of the retriever roll 12. This also maintains respective pinions 42 which are corotatively mounted on the respective end portions of the shaft 38 in driven meshing relation with the associated retriever roll driving gears 34. The gearing ratio between the pinions 42 and the gear 34 relative to the diameter of the roller 37 and the roll 12 is such that the roller 37 will be driven at a greater peripheral speed than the roll 12, thereby causing the engaged retrieved card 10 to be accelerated in overrunning relation to the retrieval roll 12. This is feasible since the perimeter of the roll 12 is of smooth surface and low coefficient of friction so that the cards can slip on such perimeter while in the grip of the overrunning high cofficient of friction roller 37.

Means are provided for coded selection of cards from the pack of cards 10, and also for limiting retrieval action of the retriever 12 to forward running of the carriage 13, with strictly idling of the retriever during return or reaward movement of the carriage. For this purpose, a set of barrier code bars 43 is provided. These bars are carried by the carriage 13 in a horizontal position with the lower edges of the bars in substantially horizontal plane slightly above the lower nip of the retrieval roll 12 and spaced above the upper edges of the cards, and more particularly the tops of the magnetic tabs 11. The construction and relationship of the barrier bars 43 is such that they normally prevent retrieval of any card by the retrieval roll 12 in either direction of movement of the carriage 13 over the cards. However, mounting of the barrier bars 43 is such that they can be relatively set or adjusted for a particular coding to enable selective retrieval withdrawal of any card in the pack of cards 10 that has the selected coded relationship to the barrier bar setting, during retrieval movements of the carriage 13, that is from left to right as shown in FIGURES 2 and 3, but nevertheless preventing retrieval of any card during return movements of the carriage, that is, toward the left as shown in FIGURES 2 and 3. In this embodiment, the barrier bars 43 have free edges which are located just sufficiently forwardly from the periphery of the retrieval roll 12 to clear selected cards withdrawn from the pack by the roll during retrieval movements of the carriage 13, while the rear end portions of the bars extend sufficiently rearwardly beyond the periphery of the roll to block withdrawal from the pack of any cards during return movements of the carriage.

Figure 7:
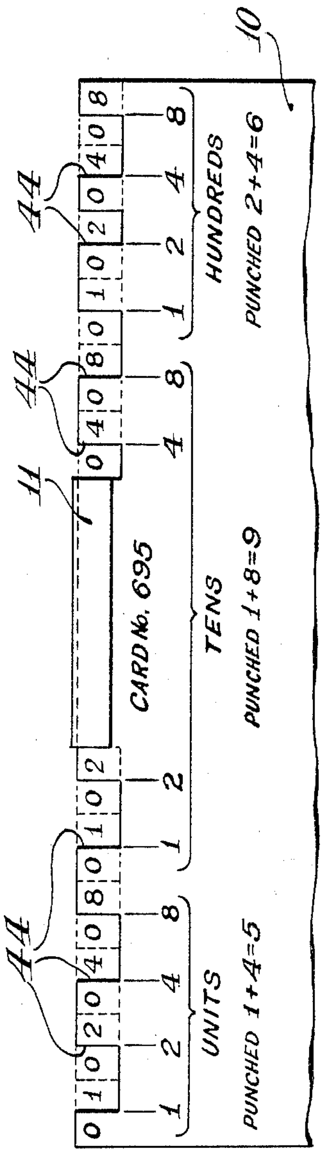
FIGURE 7 is a fragmentary view of the face of one of the cards showing it punched according to a particular code enabling its selective retrieval by means of the apparatus of the present invention.

In the exemplary unit shown, a binary coded arrangement is utilized wherein the upper edge of each of the cards 10 beyond each end of the attached magnetic tab 11 provides a coding section or area within which punched out notches 44 are adapted to provide coded correspondence to particular selection of settings of the barrier bars 43. As shown in FIGURES 6 and 7, with the aid of explanatory legends, the coding edge of the card is divided into coding locations, which for illustrative purposes are depicted by rectangular dash outlines in each of which is a code number which may actually be printed on the card, but is at least supplied in the illustrations to facilitate the description. Each coding location corresponds to a binary decade and comprises two halves, one of which is "0" and the other half of which is the decade number. In the relatively simple arrangement disclosed, four decades are utilized to code the decimal digits from one to ten. The locations for these decades are identified, illustratively, in FIGURES 6 and 7, as coupled areas "01," "02," "04," and "08" in each grouping for units, tens and hundreds. By suitably punching out the proper binary areas as shown in FIGURE 7, for example, a desired code relationship is afforded in the top sorting edge margin of the card. In this instance, "695" is code punched in the card edge. This comprises punching out of the two areas, namely the numeral and the "0" area, in each instance which will combine to provide the respective code responses for the numbers "2" and "4" and thereby afford the "600" value in the hundreds location; similarly punching out the respective areas to provide code response for the numbers "1" and "8" to afford the "90" value in the tens location; and also punching out of the areas to provide the code responses for the numbers "1" and "4" to afford the "5" in the primary or digit units location.

When it is desired to sort or select any and all of the cards 10 in the receptacle 14 which are coded with the punch-outs 44 corresponding to "695," the barrier bars 43 are relatively set or adjusted into a pattern corresponding to the selected card punchings so that as the carriage 13 is run forwardly over the pack of cards only the selected card or cards will be able to escape the barrier bars and be withdrawn from the pack and presented for removal by the retriever roll 12, while all other cards are rejected and held against leaving the pack by the barrier bars 43. For this purpose, there is a barrier bar 43 corresponding to each of the four coupled areas in each of the units, tens and hundreds sets, there being, in the example shown twelve such barrier bars, with six of the bars on each side of the retriever roll 12, as best seen in FIGURES 1, 4 and 5.

Each of the barrier bars 43 is mounted corotatively on a rock shaft 45 which extends across and is journalled rotatably in the lower marginal portions of the depending flanges 28 and 29 of the frame plate 25 which provides a keyboard for manipulably setting the barrier bars. As will be observed, the barrier bar shafts 45 are mounted in spaced parallel coextensive front-to-rear relation, with the barrier bars 43 extending rearwardly from the rear end portions of the shafts and disposed eccentrically thereto and below the axis of the corresponding shaft in each instance.

Within the keyboard housing afforded by the frame member 25, each of the rock shafts 45 has a generally upwardly projecting crank arm 47 which is rigidly affixed thereto and swingably received in a complementary socket recess 48 in a respective setting bar 49 (FIGS. 2 and 5). Suitable supporting frame structure for reciprocably guiding the setting bars 49 is mounted as a unit within the inverted U-shaped housing afforded by the frame member 25, and herein comprising a sheet metal plate member 50 disposed in spaced parallel relation below the plate 25 and suitably spaced above the set of shafts 45. Mounting of the frame member 50 is suitably effected as by attaching an angular front flange 51 thereof to the inside of the frame flange 28 and by securing a rear flange 52 to the inside surface of the rear frame flange 29 substantially as shown in FIGURE 2. Longitudinally reciprocable slidable support for the bars 49 is provided by similar depending flanges 53 on the frame member 50 spaced apart less than the lengths of the bars 49 and having respective aligned complementary bearing apertures 54 within which the respective opposite end portions of the bars are carried (FIG. 5).

Normally each of the setting bars 49 is biased into a neutral or "0" position, wherein the associated barrier bar 43 is in directly overlying relation to the "0" positions on the cards 10. In FIGURE 5, each of the barrier bars 43 disclosed as inclined toward the left side is in the "0" position. Suitable means such as respective compression springs 55 between the ends of the setting bar 49 at one end of the bar assembly and an abutment such as the adjacent end frame plate member 24 normally thrustingly urges the associated setting bar into the neutral position. When all of the setting bars 49 are in neutral position, with all of the barrier bars 43 in "0" position, complete blockage against retrieval of any card from the pack of cards 10 is afforded by the barrier bars 43, since only cards punched according to the binary code will be in the pack.

For sorting out any selected one of the cards 10, those selector bars 49 which control the positions of the barrier bars 43 corresponding to the coded notches 44 of the desired card are adjusted by shifting them to set the respective barrier bars 43 to clear all unpunched areas of the coded edge of the desired card. Conveniently, this is effected through the medium of respective sets of keys 57 (FIGS. 1, 2 and 5), the head portions of which normally project in guided relation upwardly through respective apertures 58 in the frame plate 25 providing a keyboard on the front portion of the carriage 13. In the present instance three sets of the keys are shown, there being one set for digits or units, another set for tens and another set for hundreds. Each of the keys 57 has depending centrally a flat plate vertical plunger portion 59 of a width to extend across the corresponding set of the setting bars 49, and vertically reciprocably guided through respective guide slots 60 in the frame plate 50 to register with respective upwardly opening notches 61 in the upper edge portions of the setting bars 49. Certain of the notches 61 are merely clearance notches, while others of the notches 61 are provided with diagonal cam surfaces 62 so underlying the downwardly facing edges of the plunger portions 59 in the neutral positions of the setting bars 49 that when the keys 57 are depressed the underlying cam edges 62 are engaged and actuation of the affected setting bars 49 in opposition to bias of the associated springs 55 is effected in carrier-bar-setting manner.

For example, as depicted in FIGURE 5, the "5" key of the digits set has been depressed. This actuates the "1" setting bar 49. At the same time, the "4" setting bar 49 is actuated. This causes swinging of the respective actuated barrier bars 43 toward their binary companions. It will be understood, of course, that insofar as the "2" and "8" setting bars 49 of the units or digits set are concerned, they will have merely clearance notches 61 aligned with the plunger 59 of the "5" key.

In similar fashion, depressing of the "90" key of the tens set and the "600" key of the hundreds set will effect appropriate binary correlation of the respective barrier bars 43 to attain the code selection for the card or cards punched in accordance with the code number "695," as depicted in FIGURE 5.

As each of the actuated setting bars 49 reaches its set position, a respective interlock latch 63 operates to retain the setting bar 49 in its desired set position until the latch is released and the setting bar 49 snapped into its neutral position by its return spring 55. In a desirable construction, each of the latch members 63 comprises a generally bellcrank flat member relatively pivotally mounted on a shaft 64 adjacent and above the left-hand or head end portions of the setting bars 49, as shown in FIGURE 5. An arm portion of the latch member 63 projects inwardly from the shaft 64 and has a downwardly extending detent finger 65 engageable in an appropriately placed complementary detent notch 67 presented thereto in the upper edge of the associated setting bar 49 in its code-set position. To assure latching interengagement of the detent finger 65, biasing means are provided such as a spring 68 compressively thrusting between the top of the detent arm of the latch member 63 and the overlying frame plate member 25.

When it is desired to return the code bars to neutral position, or, in other words, to clear the keyboard for resetting the code bars to effect a desired card selection, the retaining latches 63 of all of the previously set setting bars 49 are released. This is desirably effected through the medium of a release button 69 (FIGS. 1 and 5) conveniently guided through a guide aperture 70 in the frame plate 25 in proper position for actuating a release bar 71 which overlies release arm portions of the bellcrank lever latch member 63 projecting outwardly from the supporting shaft 64. Upon depressing the release button 69, the release bar 71 swings the latch levers 63 about the shaft 64 in opposition to the bias of the respective springs 68 to thereby trip the detent fingers 65 from the detent notches 67 of the setting bars 49. Instantly all of the previously set bars 49 are snapped by their biasing springs 55 toward the right as shown in FIGURE 5 into neutral position, thereby similarly swinging all of the affected barrier bars 43 to their "0" positions.

To avoid any danger of sticking or other interference from the punches 59 of the setting keys 57 with instantaneous clearing return of the setting bars 49, return biasing means such as compression springs 72 between the undersides of the heads of the keys 57 and the underlying frame plate member 50 are provided. Hence, immediately after release from the bar-setting punching pressure on any of the keys 57 it is returned to initial position clear of the setting bars 49. Upward movement of the keys under the influence of the respective springs 72 is limited to a ready position by engagement of the upper edges of the end portions of the punch portions 59, beyond the diameters of the respective key heads, with the underside of the frame plate 25 as best seen in FIGURE 2.

In a cycle of operation of the card sorting or retrieval unit of the present invention, the selected card code is punched out on the keyboard by manipulating the appropriate keys 57, thereby setting the barrier bars 43 to clear the code notches 44 in the card or cards desired to be withdrawn from the pack of cards 10. Then, the carriage 13 is operated to effect relative movement thereof over the cards 10 longitudinally of the filing receptacle 14. As the rotating magnetized retrieval roll 12 travels over the respective magnetic tabs 11 of the cards they are successively attracted to the perimeter of the roll, substantially as shown in FIGURE 3 within the limitations of line drawing, and due to the mutual magnetic repulsion tend to fan apart, thus facilitating withdrawal of the selected cards. Only the card or cards 10 responding to the coded setting of the barrier bars 43 will be permitted to remain in clinging engagement with the perimeter of the clockwise rotating retrieval roll in the travel of the carriage toward the front of the file receptacle 14. All other of the cards 10 which do not respond to the coded setting are rejected by virtue of interference by the barrier bars 43 which overlie any unpunched edge portions of the respective cards. For example, referring to FIGURE 4, showing a rear view, and assuming the rearmost card to be punched with the code designation "685," it will be observed that in this instance at least one of the barrier bars 43, namely, the second one to the right of the retrieval roll 12, overlies a solid unpunched edge portion of the card. This card is thereby precluded from being withdrawn from the pack of cards 10 in the receptacle 14 as the retriever hunts for any card responding to the selected coding for which the retriever is set, during its pass over the cards.

As shown in FIGURE 3, two of the cards in the pack are, up to the point to which the carriage 13 has travelled, found to have the selective code punchings. One such card 10 has already escaped the barrier bars 43 and has been withdrawn from the pack, and the second card 10 is in the initial stages of being withdrawn. As the withdrawal proceeds, it will be observed that by virtue of the predetermined diameter of the retrieval roll 12 substantially straight upward withdrawal of the card proceeds during forward card-searching, travel of the carriage until the top of the card reaches the nip of the overrunning pressure roller 37, which then accelerates withdrawal in the continuing forward travel of the carriage.

After a retrieval run of the carriage 13, it is returned rearwardly to starting position delimited beyond the rear end of the pack of cards 10, and back of the supporting back-up plate 17, by means such as resilient bumpers 73 mounted on the rear end portion of the receptacle member 14 and engageable with the rear edges of the side plates 24 of the carriage 13. Resetting of the barrier bars 43 may then be effected to condition the unit for withdrawing any other coded card from the pack of cards 10 and the sorting or retrieval cycle repeated.

Cards that have been sorted from the pack of cards 10 can be returned to the receptacle 14 in any haphazard relation to the other cards in the pack since the retrieval unit will find them anywhere in the pack upon demand.

It will be understood that modifications and variations may be effected without departing from the scope of the novel concepts of the present invention.

I claim as my invention:

1. In card sorting apparatus for retrieving cards from a pack of cards wherein one of their edges is exposed and has a magnetic portion and code notches:
supporting means for the pack of cards,
a retrieval assembly including:
frame structure mounted for relative movement with respect to said supporting means for traversing said edges,
magnetic card withdrawing means movably mounted on said frame structure and operative to attract said magnetic portions on the cards and withdraw the cards successively from the pack in the course of said relative movement, and barrier code bars adjustably mounted on said frame structure and adjacent to said edges with one of their end portions adjacent to said magnetic means in such relation thereto that the card edges are adapted to be blocked by said end portions against any substantial movement toward said magnetic means,
said bars being correlated with said code notches and being selectively settable to position the bars with said end portions corresponding to the code notches of a selected card to be withdrawn from the pack but to block withdrawal of all other cards from the pack,
said end portions of said bars being so located with respect to said magnetic means that the code notches of the selected card afford escape clearance past the bar ends for withdrawal by the magnetic means,
means for effecting said relative movement between said supporting means and said assembly to effect successive passing of said magnetic means in magnetic attracting relation past said magnetic portions whereby said selected card is magnetically attracted through its magnetic portion toward said magnetic means, and means for moving said magnetic means to effect withdrawal of said selected card.

2. In card sorting apparatus for retrieving cards from a pack of cards wherein one of their edges is exposed and has a magnetic portion and code notches:
supporting means for the pack of cards,
a retrieval assembly including:

frame structure mounted for relative movement ment with respect to said supporting means for traversing said edges, a rotatable magnetic card-withdrawing roll mounted on said frame structure on an axis parallel to said edges and with its perimeter located to move in a plane adjacent to the magnetic portions of said edges during said relative movement, and barrier code bars adjustably mounted on said frame structure and adjacent to said plane and with one of their end portions adjacent to said roll in such relationship that the card edges are adapted to be blocked against any substantial movement through said plane toward said roll, said bars being correlated with said code notches and being selectively settable relative to one another and to said roll to place said end portions in card edge blocking position, except for any selected card having code notching responding to a predetermined coded setting of the bars whereby such card is adapted to be withdrawn by the roll because the code notches of the selected card afford escape clearance past said end portions during withdrawal of said card, means for effecting said relative movement between said assembly and said supporting means to effect successive passing of said roll in magnetic attracting relation past said magnetic portions whereby said selected card is magnetically attracted through its magnetic portion toward the roll periphery, and means for rotating said roll to effect withdrawal of said selected card.

3. Apparatus as defined in claim 2, including means cooperative with said roll while the roll is rotating to move the selected card from the pack of cards.

4. In card sorting apparatus for retrieving cards from a pack of cards wherein one of their edges is exposed and has a magnetic portion and code notches:

supporting means for the pack of cards, a retrieval assembly including:

frame structure mounted for relative movement with respect to said supporting means for traversing said edges, a rotatable magnetic card-withdrawing roll mounted on said frame structure on an axis parallel to said edges and with its perimeter located to move in a plane adjacent to the magnetic portions of said edges during said relative movement, and barrier code bars adjustably mounted on said frame structure and adjacent to said plane and with one of their end portions adjacent to said roll in such relationship that the card edges are adapted to be blocked against any substantial movement through said plane toward said roll, said bars being correlated with said code notches and being selectively settable relative to one another and to said roll to place said end portions in card edge blocking position except for any selected card having code notching responding to a predetermined coded setting of the bars whereby such card is adapted to be withdrawn by the roll because the code notches of the selected card afford escape clearance past said end portions during withdrawal of said card, means for effecting said relative movement between said assembly and said supporting means to effect successive passing of said roll in magnetic attracting relation past said magnetic portions whereby said selected card is magnetically attracted through its magnetic portion toward the roll periphery, and means causing said roll to rotate during said relative movement for withdrawal of the cards on the off-running side of the roll as the magnetic portion of the selected card clings to the periphery of the roll.

5. Apparatus as defined in claim 4, including an overrunning pressure roller cooperative with the perimeter of the magnetic roll on its off-running side and engageable with the withdrawn selected card to accelerate its withdrawal from the pack.

6. Apparatus as defined in claim 1, in which said retrieval assembly includes means operable as the selected card is being withdrawn from the pack by the magnetic means to break the magnetic attraction of said magnetic portion of such card with respect to the magnetic means and operative to effect completion of withdrawal of the selected card from the pack.

7. Apparatus as defined in claim 1, in which said retrieval assembly includes means mounted on said frame structure and comprising mechanism for setting said bars in response to digital manipulation.

8. Apparatus as defined in claim 2, in which said frame structure comprises a carriage, guide structure on said supporting means guiding said carriage in said relative movement, and said means for rotating said roll comprising a shaft mounting the roll and means on the shaft and on said guide structure rotating the roll as the carriage and said supporting means are in said relative movement.

9. In card sorting apparatus for retrieving cards from a pack of cards wherein one of their edges is exposed and has a magnetic portion and code notches:

a carriage adapted to be mounted in respect to the pack of cards for relative movement in traversing relation to the card edges, magnetic card-withdrawing means movably mounted on said carriage and operable to attract said magnetic portions theretoward for withdrawing the cards successively from the pack in the course of said relative movement, means for moving siad magnetic means, and barrier code bars adjustably mounted on said carriage structure and adjacent to said edges with one of their ends adjacent to said magnetic means in such relation thereto that the card edges are adapted to be blocked against any substantial movement toward said magnetic means, said bars being correlated with said code notches and being selectively settable to position the bars corresponding to the code notching of a selected card to be withdrawn from the pack, said ends of said bar being so located with respect to said magnetic means that the code notches of the selected card afford escape clearance past the bar ends for withdrawal by the magnetic means.

10. In card sorting apparatus for retrieving cards from a pack of cards wherein one of their edges is exposed and has a magnetic portion and code notches:

a carriage adapted to be mounted in respect to the pack of cards for relative movement in traversing relation to the card edges, a rotatable magnetic card-withdrawing roll mounted on said carriage structure on an axis parallel to said edges and with its perimeter located to move in a plane adjacent to the magnetic portions of said edges during said relative movement, means for rotating said roll, barrier code bars adjustably mounted on said carriage structure and adjacent to said plane and with one of their ends adjacent to said roll in such relationship that the card edges are normally blocked against any substantial movement through said plane, toward said roll, said bars being correlated with said code notches and being selectively settable between card edge blocking position and relative position in which any selected card having code notching responding to a predetermined coded setting of the bars is adapted to be withdrawn by the roll and said bar ends of the selectively set bars being so located with respect to said roll that the code notches of the selected card afford escape clearance past said ends during withdrawal of said card.

References Cited by the Examiner

UNITED STATES PATENTS

| | | | |
|---|---|---|---|
| 2,269,767 | 1/1942 | Jayne | 129—16.1 |
| 2,577,460 | 12/1951 | Gottschalk | 129—16.1 |
| 2,756,931 | 7/1956 | Drillick. | |
| 2,779,652 | 1/1957 | Orr. | |
| 2,999,424 | 9/1961 | McCammon | 40—79 |
| 3,055,131 | 9/1962 | Novak. | |

FOREIGN PATENTS

| | | |
|---|---|---|
| 1,247,271 | 10/1960 | France. |

JEROME SCHNALL, *Primary Examiner.*